United States Patent [19]

Metlitsky et al.

[11] Patent Number: 5,140,146

[45] Date of Patent: Aug. 18, 1992

[54] BAR CODE SYMBOL READER WITH MODULATION ENHANCEMENT

[75] Inventors: Boris Metlitsky, Stony Brook; Edward Barkan, South Setauket; Jerome Swartz, Setauket, all of N.Y.

[73] Assignee: Symbol Technologies, Inc., Bohemia, N.Y.

[21] Appl. No.: 438,022

[22] Filed: Nov. 20, 1989

[51] Int. Cl.$^5$ .............................................. G06K 7/10
[52] U.S. Cl. ................................ 235/462; 235/463; 235/466; 235/470; 250/566
[58] Field of Search ............... 235/470, 472, 463, 462, 235/466; 250/566

[56] References Cited

U.S. PATENT DOCUMENTS

| | | | |
|---|---|---|---|
| 3,260,950 | 7/1966 | Saari | 330/294 |
| 3,798,458 | 3/1974 | Buckingham et al. | 235/463 |
| 4,000,397 | 12/1976 | Herbert et al. | 235/462 |
| 4,007,377 | 2/1977 | Simon et al. | 250/566 |
| 4,016,481 | 4/1977 | Bradley | 330/145 |
| 4,016,660 | 3/1989 | Swartz et al. | 235/472 |
| 4,243,988 | 1/1981 | Kang et al. | 343/5 |
| 4,251,798 | 2/1981 | Swartz et al. | 340/146.3 |
| 4,325,057 | 4/1989 | Swartz et al. | 235/472 |
| 4,360,798 | 11/1982 | Swartz et al. | 340/146.3 |
| 4,369,361 | 1/1983 | Swartz et al. | 235/470 |
| 4,387,297 | 6/1983 | Swartz et al. | 235/462 |
| 4,394,683 | 7/1983 | Liptay-Wagner et al. | 358/107 |
| 4,409,470 | 11/1983 | Shepard et al. | 235/472 |
| 4,460,120 | 7/1984 | Shepard et al. | 235/472 |
| 4,496,831 | 1/1985 | Swartz et al. | 235/472 |
| 4,548,211 | 10/1985 | Marks | 128/694 |
| 4,575,625 | 3/1986 | Knowles | 235/467 |
| 4,593,186 | 3/1986 | Swartz et al. | 235/472 |
| 4,607,156 | 8/1986 | Koppenaal et al. | 235/472 |
| 4,665,318 | 5/1987 | Toda et al. | 250/570 |
| 4,673,805 | 6/1987 | Shepard et al. | 235/472 |
| 4,736,095 | 4/1988 | Shepard et al. | 235/472 |
| 4,743,774 | 5/1988 | Maeda et al. | 250/570 |
| 4,749,879 | 6/1988 | Peterson et al. | 307/354 |
| 4,758,717 | 7/1988 | Shepard et al. | 235/472 |
| 4,760,248 | 7/1988 | Swartz et al. | 235/472 |
| 4,806,742 | 2/1989 | Swartz et al. | 235/472 |
| 4,808,804 | 2/1989 | Krichever et al. | 235/462 |
| 4,819,197 | 4/1989 | Blais | 364/715.06 |
| 4,835,374 | 5/1989 | Swartz et al. | 235/472 |
| 4,866,400 | 9/1989 | Britton, Jr. et al. | 330/305 |
| 4,870,262 | 9/1989 | Hasegawa | 235/436 |
| 4,876,442 | 10/1989 | Fukushima | 250/205 |
| 4,877,949 | 10/1989 | Danielson et al. | 235/462 |

OTHER PUBLICATIONS

*Microelectronic Circuits* Adel Sedra and Kenneth Smith, New York, NY LBS College Publihsing, 1987.

*Primary Examiner*—Stuart S. Levy
*Assistant Examiner*—Christopher R. Glembocki

[57] ABSTRACT

The depth of modulation of an analog electrical signal generated by a photodetector during scanning of a bar code symbol in the field of bar code scanning is enhanced under circumstances where the modulation of the analog signal has been degraded, for example, by an oversized sampling aperture in relation to the widths of the symbol elements. The analog signal has high frequency components whose low amplitudes are increased in magnitude prior to being conducted to a digitizer. The effect of noise introduced during reading of the bar code is cancelled by comparing in the comparator, the modulation-enhanced analog signal with the second derivative signal derived from the modulation-degraded unenhanced analog signal. The output of the comparator is a digital output signal having a logical level dependent on the amplitude of the enhanced analog signal at each zero crossing of the second derivative signal. The digital output signal is a closer representation of the code read by the scanner.

15 Claims, 5 Drawing Sheets

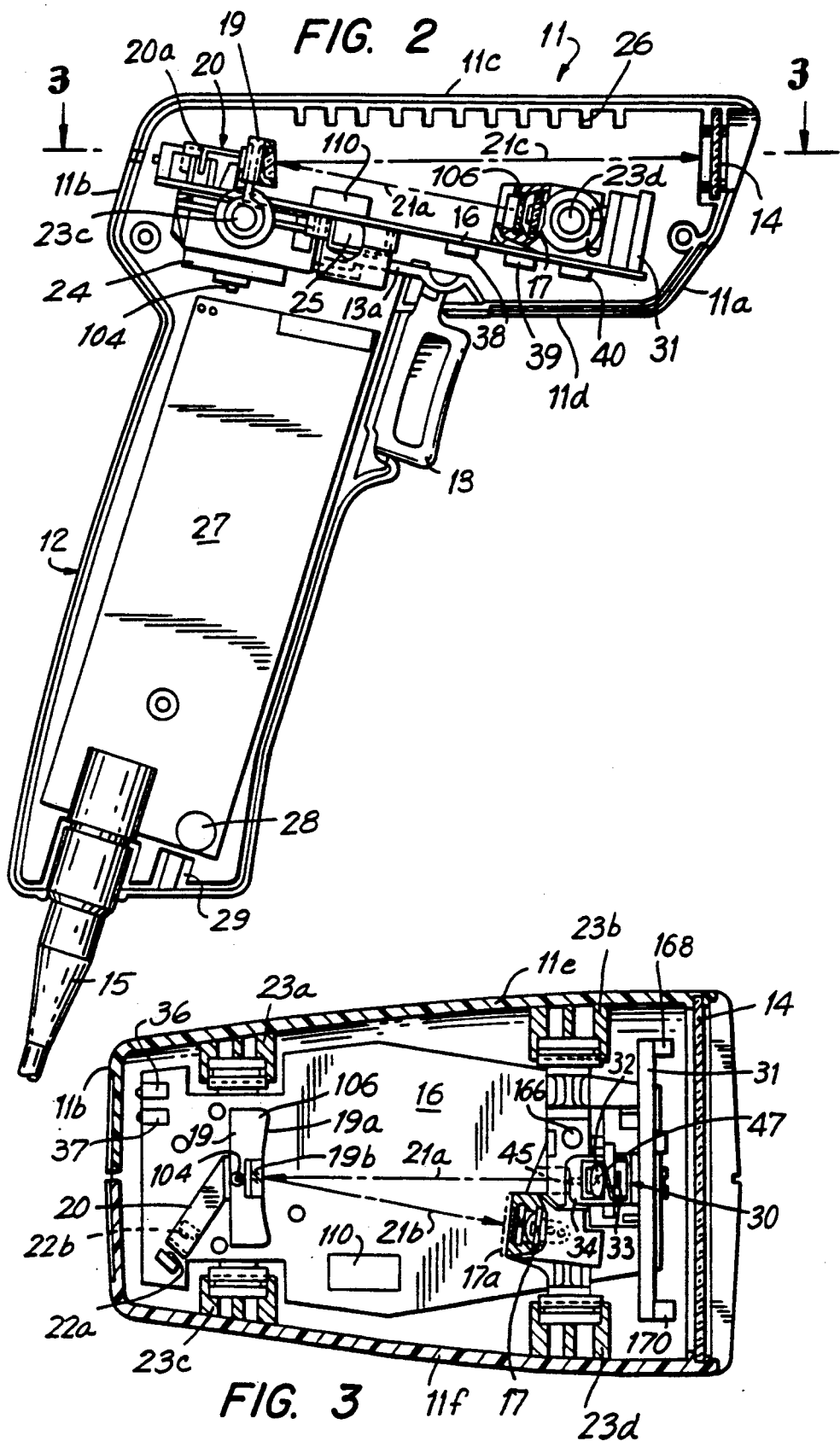

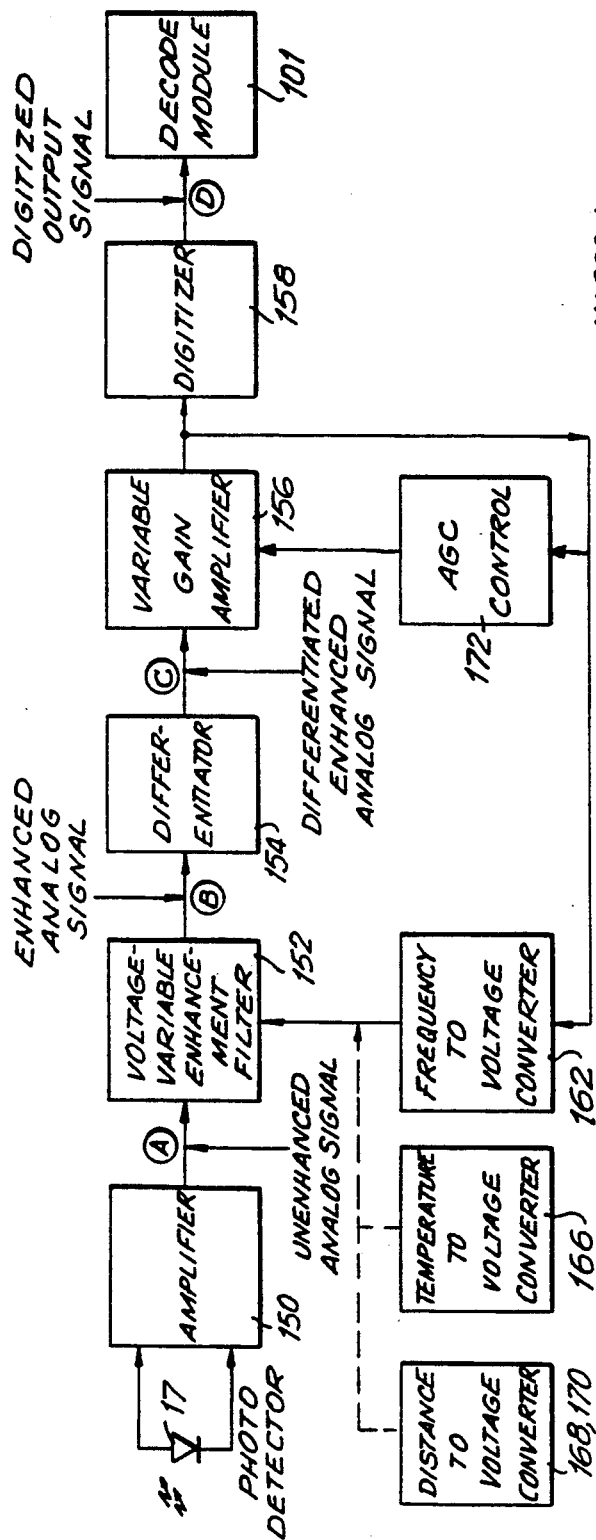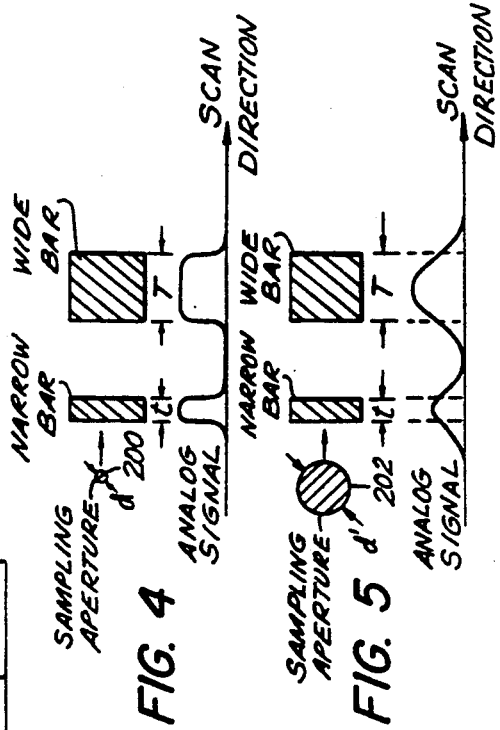

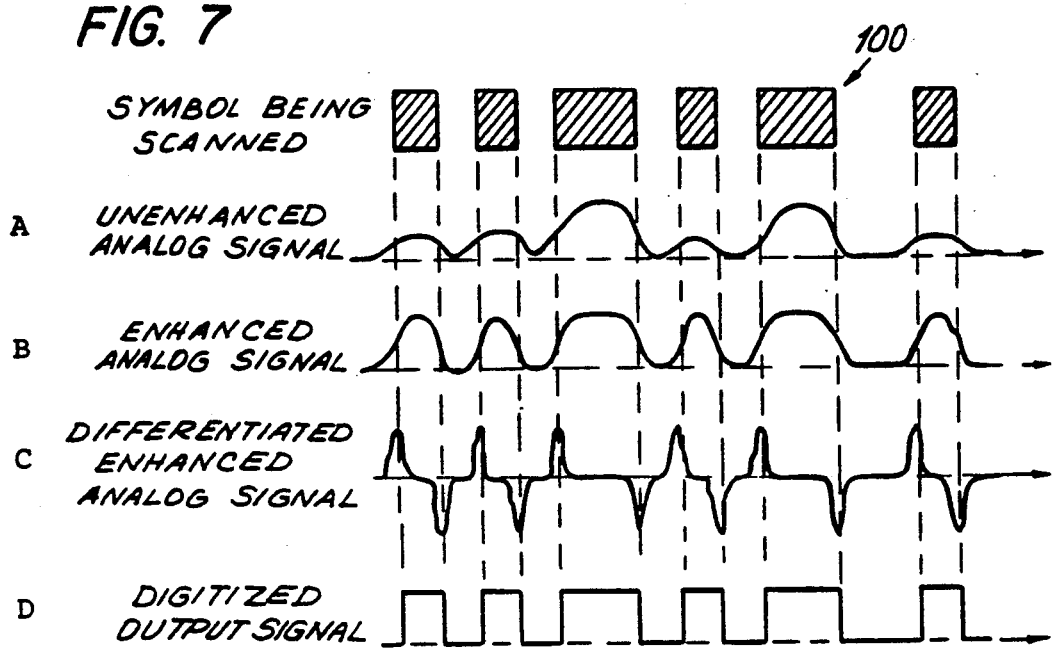
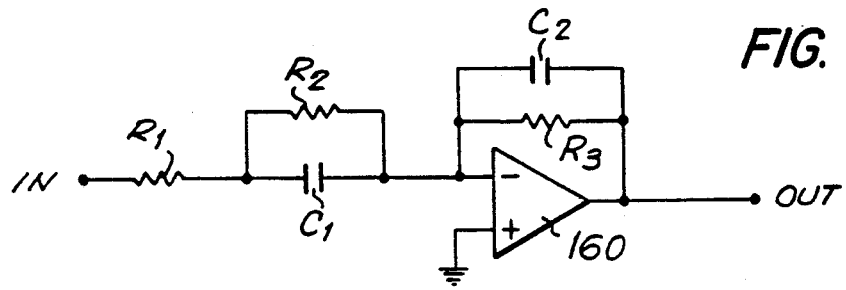
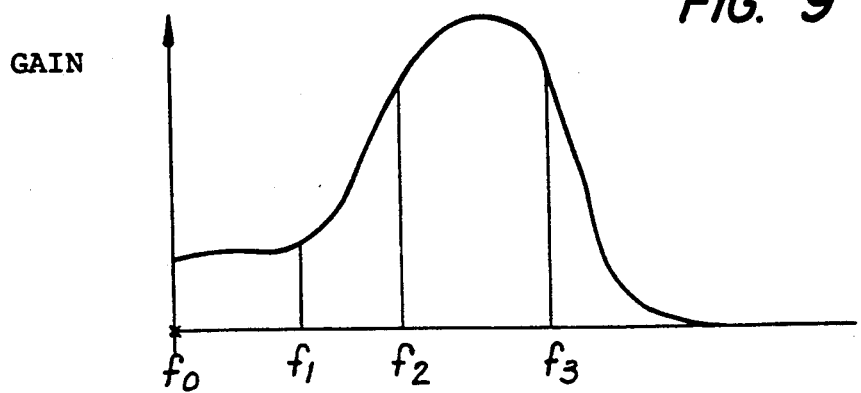

BAR CODE SYMBOL READER WITH MODULATION ENHANCEMENT

BACKGROUND OF THE INVENTION

1. Field of the Invention

This invention generally relates to the field of electro-optic readers such as laser scanners for reading bar code symbols and, more particularly, to an arrangement for, and a method of, enhancing the depth of modulation of an analog electrical signal indicative of each symbol being read under circumstances where the modulation has been degraded.

2. Description of Related Art

Various optical readers and optical scanning systems have been developed heretofore to optically read bar code symbols printed on labels affixed to objects in order to identify the object by optically reading the symbol thereon. The bar code symbol itself is a coded pattern of spatially adjacent elements comprised of a series of bars (dark elements) of various widths, and spaced apart from one another to bound spaces (light elements) of various widths, the bar and space elements having different light-reflecting characteristics. The various element widths were first converted to an electrical analog signal. The analog signal was then digitized to an electrical digital signal. The digital signal was then electronically decoded to a multiple alpha-numerical digit representation descriptive of the symbol and, hence, of the object. Scanning systems of this general type, and components for use in such systems, have been disclosed, for example, in U.S. Pat. Nos. 4,251,798; 4,360,798; 4,369,361; 4,387,297; 4,593,186; 4,496,831; 4,409,470; 4,460,120; 4,607,156; 4,673,805; 4,736,095; 4,758,717; 4,760,248; 4,806,742 and 4,808,804; as well as in U.S. patent application Ser. Nos. 196,021; 944,848; 138,563; 148,669; 148,555; 147,708; 193,265; 265,143; 265,548; 265,149 and 264,693; all of which have been assigned to the same assignee as the instant application and are incorporated herein to show the state of the art.

As disclosed in some of the above patents and applicatons, a particularly advantageous embodiment of such a scanning system resided, inter alia, in optically modifying and directing a laser light beam from a hand-held head which was supported by a user; aiming the head and, in some cases, the laser beam itself at a symbol to be read; repetitively scanning the laser beam and/or the field of view of a detector supported on the head in a scan direction across the symbol; detecting the laser light reflected off the symbol during scanning, the reflected light having a variable intensity over the scan since the bar elements reflect less light than the space elements; converting the reflected laser light of variable intensity into an electrical analog signal; digitizing the analog signal into an electrical digital signal; and decoding the digital signal.

The laser beam is optically modified and focused by an optical train, which typically includes a focusing lens, to form a beam spot having a minimum beam cross-section or waist at a reference plane. The size of the beam spot increases on either side of the reference plane, the range of distance wherein the symbol can still be read by the beam spot being known as the "depth of focus". The dimension of the beam spot along the scan direction may or may not be equal to the dimension of the beam spot along a direction perpendicular to the scan direction. A symbol can be read at either side of the reference plane. For ease of description, a symbol located between the reference plane and the head is defined as a "close-in" symbol, whereas a symbol that is located on the other side of the reference plane away from the head is defined as a "far-out" symbol. The term "close-in" symbol is also intended to cover the situation where the symbol actually is contacted by the head, or where the reference plane is located immediately outside the head. The range between minimum and maximum distances at which the system can read a symbol is often defined as the "depth of field". The depth of field is, of course, different for symbols of different densities. A high density symbol is characterized by very thin bar elements spaced very closely together so that the symbol occupies very little physical space, whereas a low density symbol is characterized by very wide bar elements spaced very far apart so that the symbol occupies a much greater physical space.

A problem associated with known laser-based and non-laser-based scanning systems, as well as wands that are manually swept across each symbol, and charge-coupled device (CCD) scanners relates to the loss of information about the symbol being scanned. Under certain circumstances, the loss of information is so great that the symbol cannot be successfully decoded and read.

The capability of the system to read symbols is determined at least in part by the size of the sampling aperture in relation to the sizes of the elements of the symbol. In a moving laser beam scanner where the outgoing laser beam itself is directed to, and swept across, the symbol, the sampling aperture is the diameter of the laser beam at the symbol, or, more particularly, the sampling aperture is the dimension of the laser beam in cross-section at the symbol as considered along the scan direction. In scanned aperture readers, the sampling aperture is the field of view of a photodetector that is scanned across the symbol. In retro-reflective readers where both the outgoing laser beam and the field of view of the photodetector are simultaneously scanned across the symbol, the sampling aperture is, once again, the beam diameter.

Traditionally, scanners have been designed with a sampling aperture of about the same size or width as the width of the narrowest bar or space element in the symbol to be scanned as considered along the scan direction. The photodetector that "watches" the sampling aperture during scanning collects light reflected off the symbol and generates an electrical analog signal indicative of the detected reflected light. The reflected light has a variable intensity across the scan, thereby causing the analog signal to constitute a succession of analog pulses whose amplitudes correspond to the amount of reflected light collected by the photodetector. Each analog pulse has a width proportional and ideally equal to the width of each bar element, and an amplitude which depends on the size of the sampling aperture relative to each bar element. By designing the sampling aperture to be about equal to the narrowest bar element, the amplitudes for both narrow and wider bar elements are approximately the same in the analog signal. Put another way, the analog signal has a nearly equal modulation amplitude for both narrow and wider bar elements.

The nearly equal modulation amplitude is very desirable to facilitate the functioning of the analog-to-digital digitizer circuit that is used to convert the analog signal to a digital signal composed of a succession of digital pulses, each having widths proportional to the widths of the corresponding analog pulses and, in turn, to the widths of the bar and space elements in the symbol being scanned.

However, a nearly equal modulation amplitude for the analog signal is not often available in practice. The aforementioned depth of focus is directly proportional to the size of the sampling aperture. It is often desirable to have scanners with a very long depth of focus so that each symbol can be read when positioned anywhere within an extended range of distances relative to the scanner. However, a long depth of focus dictates a correspondingly large size for the sampling aperture which, in turn, causes the modulation amplitude to degrade because the large sampling aperture will overlap the narrowest bar element or space element.

A larger sampling aperture is also desirable in practice in order to provide a better signal-to-noise ratio for the analog signal because more light reflected from the symbol can be collected through a larger sampling aperture.

Modulation can also be degraded by electrical low pass filtering typically employed to reduce the level of electrical noise in the system.

Analog-to-digital digitizer circuits can "square up" a modulation-degraded analog signal to some extent so that the symbol can be successfully read. All digitizer circuits, however, will eventually fail when the modulation becomes too poor.

SUMMARY OF THE INVENTION

1. Objects of the Invention

It is a general object of this invention to overcome the aforementioned drawbacks in the field of electro-optic readers, particularly laser scanners for reading bar code symbols.

It is another object of this invention to enhance the modulation of an analog electrical signal generated by a photodetector during optical reading.

A further object of this invention is to restore the modulatio of such an analog signal to the point where analog-to-digital digitizer circuits can function to read a symbol.

Still another object of this invention is to improve scanner reliability, particularly under circumstances where the modulation of the analog signal has been degraded.

Yet another object of this invention is to increase the size of a sampling aperture in relation to the size of the narrowest bar or space element in a symbol being scanned without compromising the ability of the digitizer circuit to function properly.

Another object of this invention is to provide an inexpensive optical system whose temperature characteristics are compensatable by enhancement circuitry.

A still further object of this invention is to provide a scanner with a relatively long depth of focus and a relatively high signal-to-noise ratio without sacrificing the capability of the scanner to read symbols, particularly of the high density type.

2. Features of the Invention

In keeping with these objects, and others which will become apparent hereinafter, one feature of this invention resides, briefly stated, in a system for, and a method of, reading indicia having spatially adjacent elements of narrow and wider widths and of different light reflectivity, such as bar code symbols. This invention includes means for directing light to the indicia for reflection therefrom. In a preferred embodiment, the light directing means includes a laser light source, such as a gas laser or a laser diode, and an optical train which includes at least one focusing lens for focusing the light to form a beam spot on the indicia.

Means are also provided for scanning the indicia along a scan direction with a sampling aperture whose dimension along the scan direction is larger than the width of at least one of the narrow elements. The scanning means may include, in a preferred embodiment, a reciprocally oscillating motor on which a reflecting element is mounted for joint oscillating movement, or a rotating mirrored polygon. Detector means such as a photodetector is also provided for detecting light of variable intensity reflected off the indicia along the scan direction, and for generating an analog electrical signal indicative of the detected light intensity.

As previously mentioned, the sampling aperture may correspond to the scan dimension of a moving laser beam in cross-section on the symbol and/or the field of view of the photodetector that is scanned across the symbol.

The oversized sampling aperture which, as previously noted, is advantageous for providing a desirably long depth of focus and an increased signal-to-noise ratio, however, causes the modulation of the analog signal to be degraded. More particularly, the analog signal can be characterized as having high frequency components of low amplitudes corresponding to the narrow elements of the indicia, as well as low frequency components of higher amplitudes corresponding to the wider elements of the indicia.

In order to enhance the modulation of the analog signal, this invention proposes the use of enhancement means for increasing the low amplitudes of the high frequency components of the analog signal. The enhancement means thereby converts the modulation-degraded signal to a modulation-enhanced, analog electrical signal having low and high frequency components whose respective low and higher amplitudes are closer in magnitude to each other as considered with respect to the low and higher amplitudes of the modulation-degraded signal.

Put another way, whereas the modulation-degraded signal had high and low frequency components with a substantial difference in their respective amplitudes, the modulation-enhanced signal has low and high frequency components whose respective amplitudes are nearly equal. Hence, a nearly equal modulation amplitude has been provided for both the narrow and wider elements of the indicia without compromising the ability of the system to successfully decode and read the indicia.

In a preferred embodiment, the enhancement means is a filter circuit having a gain versus frequency transmission characteristic of the type wherein the high frequency components are amplified to a greater extent than the low frequency components of the modulation-degraded signal. The transmission characteristic may be fixed or variable. When variable, the transmission characteristic is varied as a function of a system characteristic which is sensed during scanning by a sensor means operative for sensing the system characteristic. The sensor means converts the system characteristic to an output control voltage proportional to the sensed system characteristic. The filter circuit is operatively connected to the sensor means, and has its transmission characteristic varied by the output control voltage.

In the preferred embodiment, the transmission characteristic has a low gain from a first frequency to a higher second frequency, a high gain from a third frequency to a higher fourth frequency, and an intermediate gain from the second frequency to the third frequency. The aforementioned output control voltage shifts at least one of the second, third or fourth frequencies during scanning as a function of the sensed system characteristic.

The sensor means may be a frequency-to-voltage converter operative for sensing the frequency of the modulation-degraded signal and for generating the control voltage as a function of the sensed frequency. The sensed frequency varies as a function of scanning speed and the width of the elements of the indicia. Hence, by changing the transmission characteristic as a function of frequency during scanning, a practical scanner operative over a broad range of symbol densities (element widths) and scanning speeds is achieved.

The sensor means may be a temperature-to-voltage converter located in the vicinity of the aforementioned focusing lens of the light directing means for sensing the temperature in the circumambient region of the lens. The focusing lens is, in many cases, constituted of a synthetic plastic material and, therefore, its focusing characteristic is susceptible to changes in temperature. In short, the sampling aperture may be increased or decreased in size, depending upon the temperature surrounding the lens. By changing the transmission characteristic as a function of the sensed temperature, the degradation in the analog signal caused by an oversized sampling aperture may be compensated.

The sensor means may also be a distance-to-voltage converter for sensing the distance between the system and the indicia. This converter may be an ultrasonic ranging device or sonar sensor of the type commonly used in automatic focusing systems in cameras. The greater the distance to the indicia, the higher the scanning speed which, in turn, results in higher frequency components for the analog signal.

This invention enhances the modulation of the analog signal generated by the photodetector, particularly under circumstances where the sampling aperture is deliberately made larger than the narrowest element in the indicia in order to achieve a higher signal-to-noise ratio and an extended depth of field for the system. Traditional digitizer circuits can function properly to enable the indicia to be properly decoded and read despite the degradation in the modulation of such analog signals.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 2 is a vertical sectional view of the head of FIG. 1;

FIG. 3 is a plan sectional view taken on line 3—3 of FIG. 2;

FIG. 4 is an illustration depicting the generation of an analog signal of nearly equal amplitude modulation;

FIG. 5 is an illustration analogous to FIG. 4, depicting the generation of a modulation-degraded analog signal;

FIG. 6 is an electrical schematic diagram of an enhancement circuit according to one embodiment of this invention;

FIG. 7 is a collection of waveforms at various points in the diagram of FIG. 6;

FIG. 8 is an electrical schematic diagram of the enhancement circuit of FIG. 6;

FIG. 9 is a transmission characteristic of the enhancement circuit of FIG. 8;

DETAILED DESCRIPTION OF THE PREFERRED EMBODIMENTS

Figure 1:
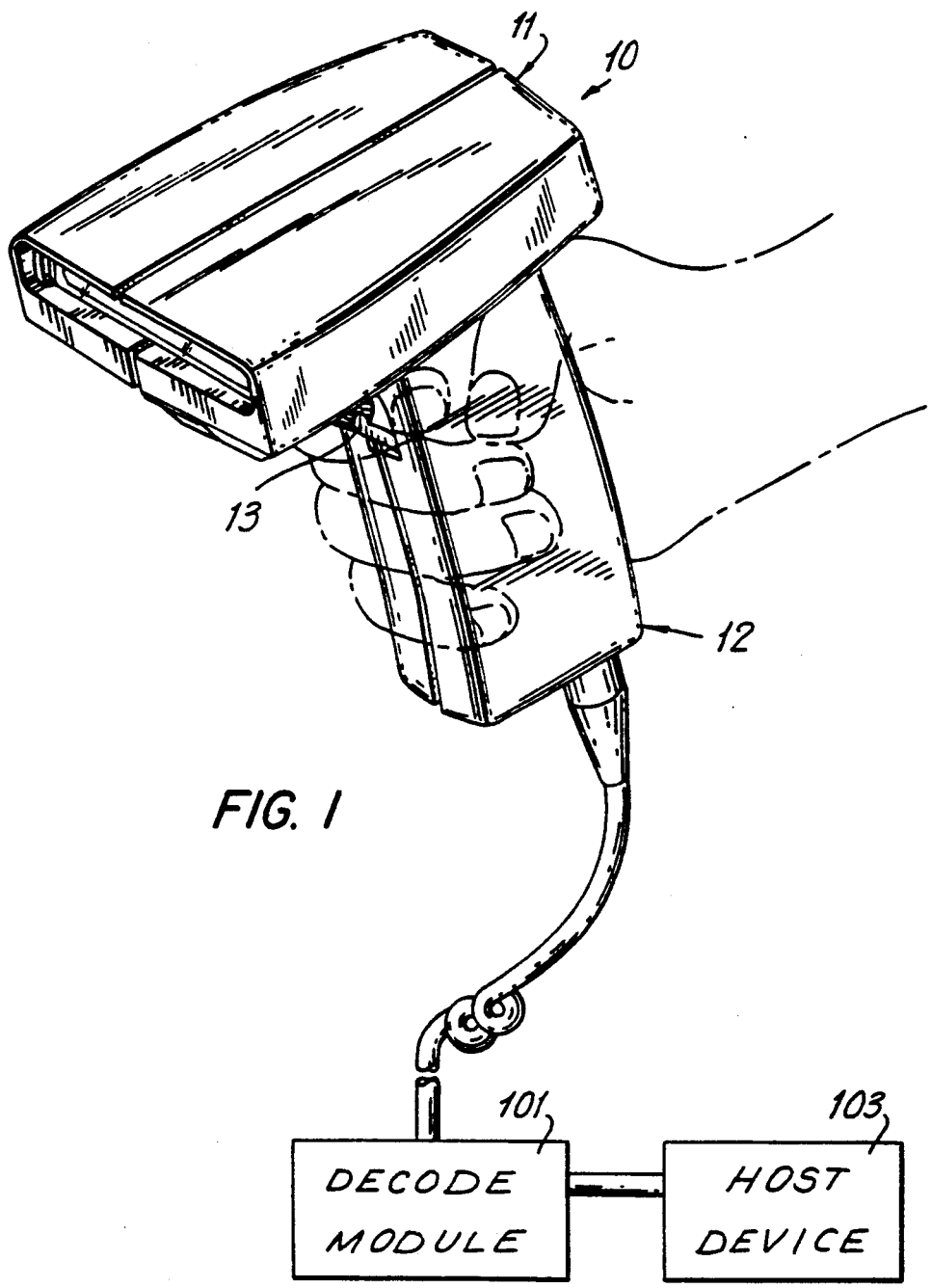
FIG. 1 is a front perspective view of a laser scanning head in use, and schematically connected to other components of a laser scanning system.

Referring now to FIGS. 1-3 of the drawings, reference numeral 10 generally identifies a lightweight (less than one pound), streamlined, hand-held, fully-portable, easy-to-manipulate, non-arm-and-wrist fatiguing laser scanning head supportable entirely by a user for use in a laser scanning system operative for reading, scanning and/or analyzing symbols, and aimable both prior to, and during, the reading thereof, by the user at the symbols, each symbol in its turn. The term "symbol", as used herein, is intended to cover indicia composed of different portions having different light-reflective properties at the wavelength of the light source, e.g. a laser, being utilized. The indicia may be the omnipresent Universal Product Code (UPC) symbol, or any of the black and white industrial symbols, e.g. Code 39, Codabar, Interleaved 2 of 5, etc. The indicia may also be any alphabetic and/or numeric characters. The term "symbol" is also intended to cover indicia located in a background field, wherein the indicia, or at least a portion thereof, have a different light-reflectivity property than that for the background field. In this latter definition, the "reading" of the symbol is of particular benefit in the fields of robotics and object recognition. For ease of description, this invention will be discussed in terms of the UPC bar code symbol composed of dark portions (bar elements) and alternating with light portions (space elements), the elements being of various widths which, when decoded, represent a code which identifies an object bearing the symbol.

Turning now to FIG. 1, the head 10 includes a generally gun-shaped housing having a handle portion 12 of generally rectangular cross-section and generally elongated along a handle axis, and a generally horizontally-elongated barrel or body portion 11. The cross-sectional dimension and overall size of the handle portion 12 is such that the head 10 conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the head 10.

As considered in an intended position of use as shown in FIG. 2, the body portion 11 has a front prow region or nose having an inclined front all 11a. The body portion 11 also has a rear region or stern having a rear wall 11b spaced rearwardly of the inclined front wall 11a. The body portion 11 also has a top wall 11c, a bottom wall 11d below the top wall 11c, and a pair of opposed side walls 11e, 11f between the top and bottom walls. The front wall 11a is sloped relative to the top and bottom walls.

A manually-actuatable, and preferably depressible, trigger 13 is mounted on a cantilever resilient arm 13a for movement relative to the head in a forwardly-facing region where the handle and body portions meet and where the user's forefinger normally lies when the user grips the handle portion in the intended position of use. The bottom wall 11d has a lower opening, and the handle 12 has a forwardly-facing slot through which the trigger 13 projects and is moved. The arm 13a has one end overlying a trigger switch 25 which is switched from an open to a closed state upon depression of the trigger 13.

A window 14 is stationarily mounted at the nose and is light-transmissive to allow laser light to pass from the interior to the exterior of the head, and vice versa.

A flexible, non-bulky, coil-type electrical cable 15 with multiple freedoms of movement interconnects the head 10 to the remainder of the components of the laser scanning system, whose operation is explained in greater detail below.

A plurality of components are shock-mounted in the head by shock mounts 23a, 23b, 23c, 23d and, as explained below, at least some of the components are actuated by the trigger 13, either directly or indirectly, by means of a control microprocessor. One of the head components is an actuatable laser light source, e.g. a semiconductor laser diode 33, operative, when actuated by the trigger 13, for propagating and generating an incident laser beam whose light preferably is, but need not be, visible to the human eye. A heat sink 31 conducts waste heat away from the diode. The emitted laser diode beam is highly divergent; diverges differently in different planes parallel and perpendicular to the longitudinal direction of beam propagation; is non-radially symmetrical, i.e. anamorphic; and has a beam cross-section resembling an oval. The diode may be of the continuous wave or pulse type. The diode requires a low voltage (e.g. 12 v DC or less) supplied by a power regulator and a battery (DC) source which may be provided within the head, or by a rechargeable battery pack accessory detachably mounted on the head, or by a power conductor in the cable 15 connected to the head from an external power supply (e.g. DC source).

An optical assembly 30 is mounted in the head on a thin, flexible, printed circuit board 16 and adjustably positioned relative to the same for optically modifying and directing the emitted laser beam along a first optical path 21a, 21c toward a reference plane which is located exteriorly of the head, either at the nose for reading symbols in contact with the front wall 11a, or forwardly of the nose for reading symbols out of contact with the front wall 11a. The reference plane lies generally perpendicular to the longitudinal direction along which the emitted laser beam propagates. A symbol to be read is located in the vicinity of the reference plane, either at, or at one side, or at an opposite side, of the reference plane; that is, anywhere within the depth of field of the optically modified laser beam and within a range of working distances as measured relative to the head. The laser beam reflects off the symbol as a specular component in one direction and as a scattered component in many directions, and that portion of the scattered laser light which travels along a second optical path 21c and 21b away from the symbol back toward the head is known herein as the returning portion.

The optical assembly includes an elongated, cylindrical optical tube 34 having at one end region a cylindrical bore in which an annular casing portion of the diode 33 is snugly received to hold the diode in a fixed position, and at the opposite end region of the optical tube 34, an aperture stop 45 is formed.

The optical assembly further includes a focusing lens 32, e.g. a plano-convex lens, preferably constituted of synthetic plastic material, located in the first optical path, and operative (with the aperture stop) for focusing the emitted laser beam at the reference plane. The aperture stop 45 may be located on either side of the lens 32, but preferably on the downstream side. A biasing means or tensioned coil spring 47 is located within the optical tube, and has one coil end bearing against a casing portion of the diode, and another coil end bearing against a planar side of the lens 32. The spring constantly urges the lens against the aperture stop.

The aperture stop has a cross-section which is about equal to the cross-section of the emitted laser beam at the aperture stop, thereby permitting a major portion of the emitted laser beam to pass through the aperture stop downstream along the first optical path en route to the symbol. The aperture stop cross-section preferably is rectangular or oval, in which case, the longer dimension of the rectangular or oval cross-section is aligned with the larger divergence angle of the laser beam to transmit more energy to the symbol.

The laser beam generated by the diode is directed rearwardly by the optical assembly along path 21a within the head to a generally planar scanning mirror 19b for reflection therefrom. The scanning mirror 19b forwardly reflects the laser beam impinging thereon along path 21c through the forwardly-facing, laser-light-transmissive window 14 and to the symbol.

As best shown in FIG. 7, a portion of a representative symbol 100 is shown and, in the case of a bar code symbol, is comprised of a series of vertical bar elements spaced apart of one another to form space elements along a scan direction. A laser beam spot is focused on the symbol. When the scanning mirror is, as explained below, reciprocally and repetitively oscillated transversely to sweep the laser beam lengthwise across all the elements of the symbol, a linear scan is generated. The linear scan can be located anywhere along the height of the elements provided that all the elements are swept. The length of the linear scan is longer than the length of the longest symbol expected to be read and, in a preferred case, the linear scan is on the order of 3 inches.

The scanning mirror 19b is mounted on a scanning means, preferably a high-speed scanner motor 24 of the type shown and described in U.S. Pat. No. 4,387,397, the entire contents of said patent being incorporated herein by reference and made part of the instant application. For the purpose of this application, it is believed to be sufficient to point out that the scanner motor 24 has an output shaft 104 on which a support bracket 19 is fixedly mounted. The scanning mirror is fixedly mounted on the bracket. The motor is driven to reciprocally and repetitively oscillate the shaft in alternate circumferential directions over arc lengths of any desired size, typically less than 360°, and at a rate of speed on the order of a plurality of oscillations per second. In a preferred embodiment, the scanning mirror and the shaft jointly are oscillated so that the scanning mirror respectively sweeps the laser diode beam impinging thereon through an angular distance or arc length at the reference plane of about 32° and at a rate of about 20 scans or 40 oscillations per second.

Referring again to FIG. 2, the returning portion of the scattered component of the reflected laser light has a variable light intensity, due to the different light-reflective properties of the various elements that comprise the symbol 100, over the symbol during the scan. The returning portion of the reflected laser light is collected by a generally concave, spherical collecting mirror 19a, and is a broad conical stream of light in a conical collecting volume centered on path 21c. The collecting mirror 19a reflects the collected conical light into the head along path 21b through a laser-light-transmissive element 106 to a sensor means, e.g. a photosensor 17. The photosensor 17, preferably a photodiode, detects the variable intensity of the collected laser light over a field of view which extends along, and preferably beyond, the linear scan, and generates an electrical analog signal indicative of the detected variable light intensity.

The collecting mirror 19a is also mounted on the support bracket 19 and, when the scanning mirror is actuated by the trigger, the collecting mirror is reciprocally and repetitively oscillated transversely, sweeping the field of view of the photodiode lengthwise across the symbol in a linear scan.

The scanning mirror and the collecting mirror are, in a preferred embodiment, of one-piece construction, but the scanning mirror can also be a discrete, small, planar mirror attached by glue, or molded in place, at the correct position and angle on a discrete, front surfaced, silvered concave mirror. The concave collecting mirror serves to collect the returning portion of the laser light and to focus the same on the photodiode.

Also mounted in the head are various electrical subcircuits mounted on board 16. For example, signal processing means 110 on board 16 are operative for processing the analog electrical signal generated by the sensor, and for generating a digitized video signal. Data descriptive of the symbol can be derived from the video signal. Suitable analog-to-digital signal processing means for this purpose was described in U.S. Pat. No. 4,251,798. Component 39 on board 16 constitutes drive circuitry for the scanner motor, and suitable motor drive circuitry for this purpose was described in U.S. Pat. No. 4,387,297. Component 40 on board 16 is a voltage converter for converting the incoming voltage to one suitable for energizing the laser diode 33. The entire contents of U.S. Pat. Nos. 4,251,798 and 4,387,297 are incorporated herein by reference and made part of the instant application.

The digitized video signal is conducted, in one embodiment, along cable 15 to decode/control module 101 (see FIG. 1) operative for decoding the digitized video signal to a digitized decoded signal from which the desired data descriptive of the symbol is obtained, in accordance with an algorithm contained in a software control program. The decode/control module includes a PROM for holding the control program, a RAM for temporary data storage, and a control microprocessor for controlling the PROM and RAM. The decode/control module determines when a successful decoding of the symbol has been obtained, and also terminates the reading of the symbol upon the determination of the successful decoding thereof. The initiation of the reading is caused by depression of the trigger. The decode/control module also includes control circuitry for controlling the actuation of the actuatable components in the head, as initiated by the trigger, as well as for communicating with the user that the reading has been automatically terminated as, for example, by sending control signals to indicator lamps 36, 37 to illuminate the same.

The decoded signal is conducted to a remote, host computer 103 which serves essentially as a large data base, stores the decoded signal and, in some cases, provides information related to the decoded signal. For example, the host computer can provide retail price information corresponding to the objects identified by their decoded symbols.

In another embodiment, the decode/control module and a local data storage means are mounted on another printed circuit board 27 in the handle portion, and store multiple decoded signals which have been read. The stored decoded signals thereupon can be unloaded to a remote host computer. By providing the local data storage means, the use of the cable during the reading of the symbols can be eliminated—a feature which is very desirable in making the head as freely manipulatable as possible. A beeper 28 is also operationally mounted on board 27 so that the user can hear through a port 29 in the handle when a symbol has been successfully read.

In accordance with this invention, enhancement means are provided for enhancing the information contained in the analog signal generated by the photodetector 17 under circumstances when the modulation of the analog signal has been degraded, e.g. when the sampling aperture is larger in size than the narrowest element of the symbol. As previously discussed, the sampling aperture corresponds to the width of the laser beam in cross-section at the symbol, or the width of the field of view of the photodetector at the symbol, each width as considered along the scan direction.

Attention is now drawn to FIG. 4, wherein a sampling aperture 200 is, for convenience, shown as a circular spot of diameter d. A narrow bar element of width t is also shown adjacent a wide bar element of width T. In FIG. 4, d is approximately the same size as t and, hence, the analog signal generated during scanning comprises a series of analog pulses whose peaks have nearly the same amplitude for both narrow and wide bar elements and whose widths correspond to the widths of the bar elements. Thus, the depth of modulation of the analog signal shown in FIG. 4 is nearly equal for all bar elements. Hence, this analog signal is readily digitized and decoded by the decode module 101.

FIG. 5 shows the situation where the sampling aperture 202 has a diameter d' which is greater than the width t of the narrow bar element. In this case, the amplitude of the analog pulse corresponding to the narrow bar is much less than the amplitude of the pulse corresponding to the wide bar. The analog signal shown in FIG. 5 has thus been degraded due to the oversized sampling aperture 202. The lower the amplitudes of the pulses corresponding to the narrow bar elements, the more difficult it will be for the analog-to-digital digitizer and the decode module to function properly. When the amplitudes of the narrow elements are too low, the digitizer will fail, and the symbol will not be decoded.

Since an oversized sampling aperture is advantageous, as described above, for increasing the depth of focus and for increasing the signal-to-noise ratio, this invention relates to enhancing the modulation-degraded analog signal so that the digitizer is less likely to fail. Also, less expensive and less complex digitizer circuits can now be used without compromising system resolution, due to the enhancement provided.

Attention is now drawn to FIG. 6 where the analog signal at the output of the photodetector 17 is amplified by amplifier 150, and this unenhanced analog signal has waveform A which is depicted in FIG. 7 and is compared to the bar and space elements of symbol 100 being scanned. Due to the oversized sampling aperture, the modulation of the analog signal has been degraded. Specifically, the analog pulses corresponding to the narrow elements have a lower amplitude than that of the wide elements. An enhancement filter 152, and preferably one that is voltage variable, performs the task of enhancing the modulation to generate an enhancement analog signal having waveform B which, as depicted in FIG. 7, has analog pulses corresponding to the narrow and wide elements whose amplitudes are closer together in magnitude. Details of the enhancement are described below.

The enhancement analog signal, in a preferred embodiment, is then differentiated in a differentiator 154 to produce a differentiated enhanced analog signal having a waveform C, which is also depicted in FIG. 7. The differentiated signal, thereupon, is conveyed to a variable gain amplifier 156, and then to a digitizer 158 to generate a digitized output video signal having waveform D which is likewise depicted in FIG. 7. The digitizer 158 may be identical to the circuitry described and claimed in U.S. Pat. No. 4,360,798, the entire contents of which are hereby incorporated herein by reference. The digitized output signal is then decoded by a decode module 101. The widths of the digital pulses correspond to the widths between inflection points of the analog pulses which, in turn, correspond to the widths of the bar elements.

If the unenhanced analog signal (FIG. 7 waveform A) is observed, it will be seen that the modulation caused by the narrow bar elements is not only lower in amplitude, but also is higher in frequency as compared to that of the wide bar elements. The enhancement filter 152 is thus provided with a transmission characteristic which provides a higher gain for the frequencies of the narrow elements than the gain that it provides for the frequencies of the wider elements. Hence, the amplitudes of the pulses for the narrow elements are increased, and preferably up to magnitudes which correspond to the magnitudes of the wider elements.

FIG. 8 shows one embodiment of an enhancement filter having such a transmission characteristic, which is illustrated in the graph of FIG. 9. An operational amplifier 160 has a grounded positive input and a negative input. A first filter stage, consisting of a resistor $R_3$ connected in parallel with a capacitor $C_2$, is connected across the negative input and an output of the amplifier 160. A second filter stage, consisting of a resistor $R_2$ connected in parallel with a capacitor $C_1$, is connected in series with the negative input of the amplifier 160. A resistor $R_1$ is connected in series with the second stage. The FIG. 8 network has one real zero and two real poles.

As shown in FIG. 9, the transmission characteristic has a low gain from a first frequency $f_0$ to a second higher frequency $f_1$, an intermediate gain from the second frequency $f_1$ to a third higher frequency $f_2$, and a higher gain from the third frequency $f_2$ to a fourth higher frequency $f_3$, after which the gain rolls off toward zero in a direction of increasing frequency.

As described so far, the transmission characteristic of the enhancement filter 152 is fixed, i.e. passive. This is satisfactory for systems that only read symbols of a known density and that only read symbols at a certain known distance from the laser scanning head so that the scanning speed across the symbol is the same for each symbol. In such an event, the enhancement filter of FIG. 8 can be provided with fixed resistors and capacitors such that the expected frequencies corresponding to the narrow bar elements will predictably fall within the high gain range between frequency $f_2$ and frequency $f_3$ and, at the same time, the expected frequencies corresponding to the wide elements will predictably fall within the low gain range between frequency $f_0$ and frequency $f_1$.

However, a practical scanner needs to function properly over a broad range of symbol densities (element widths) and an extended range of working distances. Since the scanner, in practice, does not know in advance what element width or working distance (scanning speed) it will encounter, the filter circuit must be tuned on a real time basis during actual scanning to match the frequencies of the analog signal pulses. In other words, the transmission characteristic of FIG. 9 is controlled by shifting at least one of the frequencies $f_1$, $f_2$, $f_3$ to insure that the high frequency components of the analog signal indeed will fall within the high gain range of frequencies between $f_2$ and $f_3$ and, at the same time, the low frequency components of the analog signal will indeed fall within the low gain range of frequencies between $f_0$ and $f_1$.

Figure 10:
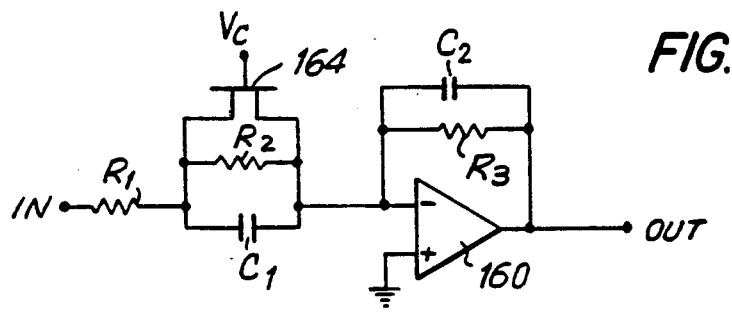
FIG. 10 is an electrical schematic diagram of an enhancement circuit according to still another embodiment of this invention.

A sensor, therefore, is provided for sensing a system characteristic, e.g. the frequency of the narrow bar elements, and for tuning the enhancement filter as a function of such sensed system characteristic. As shown in FIG. 6, the enhanced analog signal is fed, after being differentiated, to a frequency-to-voltage converter 162 operative for sensing the frequencies of the elements of the symbol and for generating an output control voltage $V_c$ whose magnitude is directly proportional to the sensed frequency. A suitable frequency-to-voltage converter is available from National Semiconductor, Inc., integrated chip Model No. LM2907 or LM2917. As shown in FIG. 10, the control voltage $V_c$ is fed to an input terminal of a field effect transistor (FET) 164 whose output terminals may be connected across any one of the resistors $R_1$, $R_2$ or $R_3$ of the enhancement filter. If the FET is connected across resistor $R_2$, as shown in FIG. 10, then frequency points $f_1$ and $f_2$ in FIG. 9 are shifted. If the FET is connected across resistor $R_1$, then the frequency point $f_2$ will be shifted. If the FET is connected across resistor $R_3$, then the frequency point $f_3$ will be shifted.

Rather than, or in addition to, tuning the filter circuit 152 as a function of frequency of the analog signal, a temperature sensor can be used to monitor the temperature in the vicinity of the focusing lens 32, and the detected temperature can be used to generate the output control voltage $V_c$ which, as described above, is used to tune the filter circuit 152. As previously noted, the focusing lens 32 is preferably constituted of plastic rather than glass, principally for reasons of economy, in which event, the plastic lens has its focusing characteristic changeable as a function of temperature variations. This can cause the sampling aperture to increase in size and degrade the analog signal. A temperature-to-voltage sensor 166 (see FIGS. 3 and 6) is mounted near the lens, and is operative to generate the output control voltage $V_c$ for input to the FET 164. A temperature-to-voltage sensor converter suitable for this purpose is available from National Semiconductor, Inc., integrated chip Model No. LM135/235/335 or LM135A/235A/335A.

Rather than, or in addition to, tuning the enhancement filter 152 as a function of frequency and temperature, a distance sensor can be used to measure the distance at which the symbol is located away from the head. The greater this distance, the greater the scanning speed and the greater the frequency of the elements of the symbol. The distance sensor is operative for generating the output control voltage $V_c$ which, in turn, as described above, tunes the enhancement filter 152. The distance sensor used can be of the type developed for camera auto-focusing, proximity switching and optic distance measuring and, for example, is available from Hamamatsu, Inc., integrated circuit Model No. H2152, H1783 or H2663. This sensor applies the principle of triangular measurement, and finds the distance to the symbol by radiating infrared rays from a light emitting diode 168 to the symbol and receiving the reflected light with a position sensitive detector 170 (see FIGS. 3 and 6).

Returning to FIG. 6, the output of the differentiator feeds a variable gain amplifier 156 whose gain is controlled by an automatic gain control (AGC) circuit 172. The AGC circuit senses the amplitude of the signal going into the digitizer 158, and adjusts the variable gain amplifier 156 to insure that the signal amplitude stays within the range over which the digitizer 158 can operate. The amplifier 156 is designed so its bandwidth is reduced as its gain is increased, thereby minimizing noise in high gain situations. The AGC function is optional when the enhancement filter is used, but generally will improve the working distance range of the scanner, thereby maximzing the benefit of the enhancement circuitry.

The digitizer 158 represented in FIG. 6 is a circuit that can locate the peaks of the differentiated analog signal. These peaks, as mentioned earlier, correspond to the inflection points of the analog signal. The space between the inflection points is an accurate representation of the bar or space element being scanned, so that it is desirable to use a digitizer that can locate them. The location of the inflection points is not distorted by the enhancement filter 152.

Other types of digitizers and enhancement circuits may be used. Attention is now drawn to FIG. 11 wherein the unenhanced analog signal having waveform A is conducted to two branches of an enhancement circuit. In the first branch, the unenhanced analog signal having waveform A (see FIG. 7) is conducted through the passive enhancement filter 152 shown in FIG. 8, whereupon the enhanced analog signal having waveform B is generated and fed to one input of a comparator 174. In the second branch, the unenhanced analog signal is conducted to a first differentiator 176 operative for generating a first differentiated signal having waveform E (see FIG. 12). This first differentiated signal is then conducted to a second differentiator 178 operative for generating a second differentiated signal having a waveform F (see FIG. 12). The second differentiated signal is compared in the comparator 174 with the enhanced analog signal provided by the output of the enhancement filter 152. The comparator 174 produces a digitized output signal having a waveform D which has a logical level dependent on the amplitude of the enhanced analog signal at the time of each zero crossing of the second derivative signal. The zero crossings of the second derivative signal reflect the actual transitions of the input signal between binary levels (edge enhancement) and not small, rapid shifts in the input level as might be caused by noise. A more accurate digital signal thus is obtained at the output of the comparator and digitizer. This output digital signal is closer to the true representation of the code read by the reading device and cancels the effect of noise introduced during the reading of the bar code.

Figure 11:
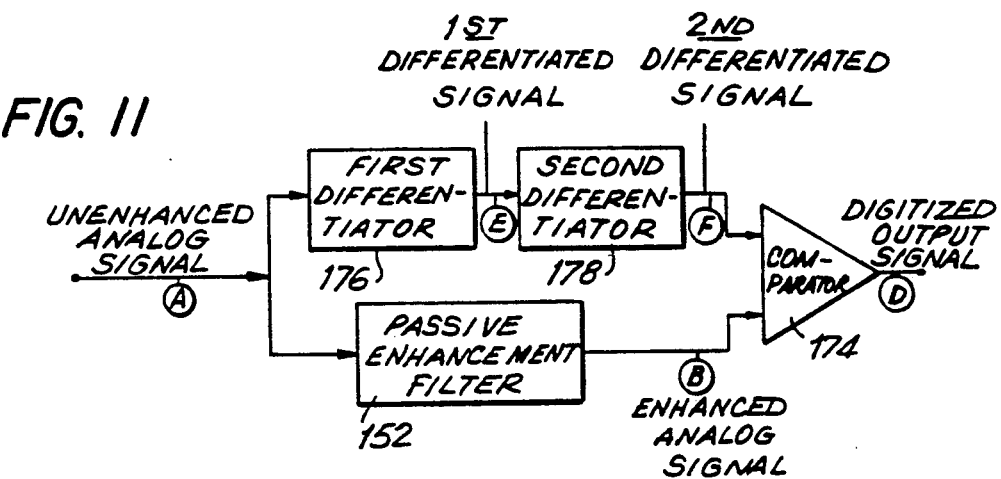
FIG. 11 is an electrical schematic diagram of an enhancement circuit according to still another embodiment of this invention.
Figure 12:
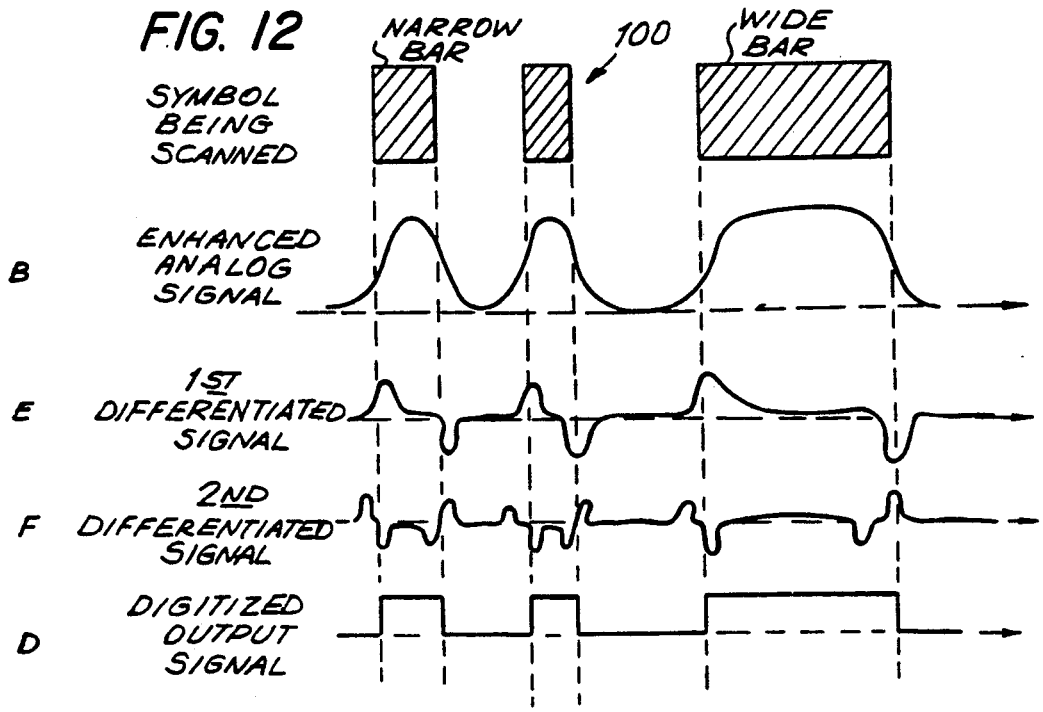
FIG. 12 is a collection of waveforms at various points in the diagram of FIG. 11.

The enhancement circuitry of FIG. 11 is less likely to generate false trailing edges for wide bar symbols. Hence, the enhancement filter 152 may be passive, i.e. not voltage variable, without sacrificing system resolution.

The edge enhancement technique described herein is of particular benefit in the field of laser bar code scanners, but need not be limited to that field. The laser used may be a helium-neon gas laser, or a semiconductor laser diode of the infrared or visible type. Non-laser light sources may also be used, e.g. a light emitting diode. The outgoing light beam need not be automatically scanned, but may be manually scanned as is common with wand-type readers. The scanner need not include a hand-held head of the type shown in FIG. 1, since all of the scanner components can be mounted in a stand-alone workstation which is either fixed or movable at any location. The decode module 101 need not be located exteriorly of the scanner head, but, instead, may be physically incorporated within the head itself. A keyboard and/or a display may also be incorporated in a hand-held scanner so as to constitute an intelligent field-portable terminal. In short, the edge enhancement techniques described herein may be used with many different types of electro-optical readers. With the enhancement circuitry described above, the laser optics may be conveniently and inexpensively fabricated as one or more plastic lenses whose temperature dependence is easily compensated by the enhancement circuitry.

It will be understood that each of the elements described above, or two or more together, also may find a useful application in other types of constructions differeing from the types described above.

While the invention has been illustrated and described as embodied in bar code symbol readers with edge enhancement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A system for reading indicia having spatially adjacent elements of narrow and wider widths and of different light reflectivity, comprising:
   (a) means for directing light from a source of light to the indicia for reflection therefrom;
   (b) means for scanning the indicia along a scan direction with a sampling aperture whose dimension along the scan direction is larger than the width of at least one of the narrow elements;
   (c) detector means for detecting light of variable intensity reflected off the indicia along the scan direction, and for generating a modulation-degraded, analog electrical signal having high frequency components of low amplitudes corresponding to the narrow elements, and low frequency components of higher amplitudes corresponding to the wider elements; and
   (d) enhancement means for increasing the low amplitudes of the high frequency components, and for converting the modulation-degraded signal to a modulation-enhanced, analog electrical signal having low and high frequency components whose respective low and higher amplitudes are closer in magnitude to each other as considered with respect to the low and higher amplitudes of the modulation-degraded, analog electrical signal; wherein the enhancement means includes sensor means for sensing a system characteristic and a filter circuit having a gain versus frequency transmission characteristic such that the high frequency components are amplified to a greater extent than the low frequency components of the modulation-degraded, analog electrical signal, the sensor means varying the transmission characteristic as a function of the sensed system characteristic.

2. The system as recited in claim 1, wherein the sensor means is a system characteristic-to-voltage converter operative for generating an output control voltage proportional to the sensed system characteristic; and wherein the filter circuit is operatively connected to the converter, and has its transmission characteristic varied by the output control voltage.

3. The system as recited in claim 2, wherein the transmission characteristic has a low gain from a first frequency to a higher second frequency, a high gain from a third frequency to a higher fourth frequency, and as intermediate gain from said second frequency to said third frequency, and wherein the output control voltage shifts at least one of the second, third and fourth frequencies.

4. The system as recited in claim 3, wherein the filter circuit includes a dual input operational amplifier having an output, one of the inputs of the amplifier being grounded; a first stage including a first resistor and a first capacitor connected in parallel with each other and also connected in parallel across the other input and the output of the amplifier; a second stage including a second resistor and a second capacitor connected in parallel with each other and connected in series with the other input of the amplifier; and a third resistor connected in series with the second stage and the other input of the amplifier; and a control component operatively connected to one of the resistors and the capacitors, said control component having an input control terminal for receiving the output control voltage, and for shifting said at least one frequency as a function of the output control voltage.

5. The system as recited in claim 4, wherein the control component is a field effect transistor having a gate terminal for receiving the output control voltage, an a pair of output terminals connected in parallel across on of the resitors.

6. The system as recited in claim 2, wherein the sensor means is a frequency-to-voltage converter operatively connected to the detector means for sensing the frequency of the modulation-degraded signal, and for generating the output control voltage as a function of the sensed frequency.

7. The system as recited in claim 2, wherein the sensor means is a temperature-to-voltage converter located in the vicinity of the light directing means for sensing a temperature thereof, and for generating the output control voltage as a function of the sensed temperature.

8. The system as recited in claim 7, wherein the means for directing light includes a focusing lens for focusing said light along the scan direction, and wherein the sensor means is located in the circumambient region of the focusing lens.

9. The system as recited in claim 2, wherein the sensor means is a distance-to-voltage converter for sensing a distance between the system and the indicia, and for generating the output control voltage as a function of the sensed distance.

10. The system as recited in claim 1, wherein the system is a moving beam laser scanner for reading bar code symbols on a real-time basis; and wherein the means for directing light includes means for generating and directing a laser beam to each symbol, and means for optically modifying the laser beam to have a beam spot whose dimension along the scan direction constitutes the sampling aperture; and wherein the scanning means sweeps the beam spot across each symbol.

11. The system as recited in claim 1, wherein the detector means is a photosensor having a field of view which constitutes the sampling aperture, and wherein the means for scanning scans the field of view.

12. The system as recited in claim 1, wherein the system is a retro-reflective laser scanner for reading bar code symbols on a real-time basis; and wherein the means for directing light includes means for generating and directing a laser beam to each symbol, and means for optically modifying the laser beam to form a beam spot in cross-section; and wherein the detector means is a photosensor having a field of view which overlaps the beam spot on each symbol; and wherein the means for scanning scans both the laser beam spot and the field of view across each symbol.

13. A method of reading indicia having spatially adjacent elements of narrow and wider widths and of different light reflectivity, comprising the steps of:
   (a) directing light from a source of light to the indicia for reflection therefrom;
   (b) scanning the indicia along a scan direction with a sampling aperture whose dimension along the scan direction is larger than the width of at least one of the narrow elements;
   (c) detecting light of variable intensity reflected off the indicia along the scan direction, and generating a modulation-degraded, analog electrical signal having high frequency components of low amplitudes corresponding to the narrow elements, and low frequency components of higher amplitudes corresponding to the wider elements; and (d) increasing the low amplitudes of the high frequency components, and for converting the modulation-degraded signal to a modulation-enhanced, analog electrical signal having low and high frequency components whose respective low and higher amplitudes are closer in magnitude to each other as considered with respect to the low and higher amplitudes of the modulation-degraded, analog electrical signal; wherein the step of increasing includes amplifying the high frequncy components to a greater extent than the low frequency components of the modulation-degraded, analog electrical signal, sensing the frequency of the modulation-degraded signal, and amplifying the high frequency components as a function of the sensed frequency.

14. A method of reading indicia having spatially adjacent elements of narrow and wider widths and of different light reflectivity, comprising the steps of:

(a) directing light from a source of light to the indicia for reflection therefrom;

(b) scanning the indicia along a scan direction with a sampling aperture whose dimension along the scan direction is larger than the width of at least one of the narrow elements;

(c) detecting light of variable intensity reflected off the indicia along the scan direction, and generating a modulation-degraded, analog electrical signal having high frequency components of low amplitudes corresponding to the narrow elements, and low frequency components of higher amplitudes corresponding to the wider elements; and (d) increasing the low amplitudes of the high frequency components, and for converting the modulation-degraded signal to a modulation-enhanced, analog electrical signal having low and high frequency components whose respective low and higher amplitudes are closer in magnitude to each other as considered with respect to the low and higher amplitudes of the modulation-degraded, analog electrical signal; wherein the step of increasing includes amplifying the high frequency components to a greater extent than the low frequency components of the modulation-degraded, analog electrical signal, sensing the ambient temperature, and amplifying the high frequency components as a function of the sensed temperature.

15. A method of reading indicia having spatially adjacent elements of narrow and wider widths and of different light reflectivity, comprising the steps of:

(a) directing light from a source of light to the indicia for reflection therefrom;

(b) scanning the indicia along a scan direction with a sampling aperture whose dimension along the scan direction is larger than the width of at least one of the narrow elements;

(c) detecting light of variable intensity reflected off the indicia along the scan direction, and generating a modulation-degraded, analog electrical signal having high frequency components of low amplitudes corresponding to the narrow elements, and low frequency components of higher amplitudes corresponding to the wider elements; and (d) increasing the low amplitudes of the high frequency components, and for converting the modulation-degraded signal to a modulation-enhanced, analog electrical signal having low and high frequency components whose respective low and higher amplitudes are closer in magnitude to each other as considered with respect to the low and higher amplitudes of the modulation-degraded, analog electrical signal; wherein the step of increasing includes amplifying the high frequency components to a greater extent than the low frequency components of the modulation-degraded, analog electrical signal, sensing a distance between the indicia and a scanning head, and amplifying the high frequency components as a function of the sensed distance.

* * * * *